(12) United States Patent
Pierce

(10) Patent No.: US 12,297,602 B2
(45) Date of Patent: May 13, 2025

(54) TOOL AND METHOD FOR PRODUCING A 3D MOLDED PULP PRODUCT

(71) Applicant: Celwise AB, Norrköping (SE)

(72) Inventor: David Pierce, Norrköping (SE)

(73) Assignee: Celwise AB, Norrköping (SE)

( * ) Notice: Subject to any disclaimer, the term of this patent is extended or adjusted under 35 U.S.C. 154(b) by 415 days.

(21) Appl. No.: 17/419,890

(22) PCT Filed: Jan. 3, 2020

(86) PCT No.: PCT/EP2020/050059
§ 371 (c)(1),
(2) Date: Jun. 30, 2021

(87) PCT Pub. No.: WO2020/141208
PCT Pub. Date: Jul. 9, 2020

(65) Prior Publication Data
US 2022/0049432 A1 Feb. 17, 2022

(30) Foreign Application Priority Data
Jan. 3, 2019 (SE) .................................... 1950005-7

(51) Int. Cl.
*D21J 3/10* (2006.01)
*B29C 33/02* (2006.01)
*B29C 33/38* (2006.01)

(52) U.S. Cl.
CPC ................ *D21J 3/10* (2013.01); *B29C 33/02* (2013.01); *B29C 33/3814* (2013.01)

(58) Field of Classification Search
CPC ....... D21J 3/10; D21J 7/00; D21J 3/00; B29C 33/02; B29C 33/3814; B29C 51/365
See application file for complete search history.

(56) References Cited

U.S. PATENT DOCUMENTS

| 1,709,338 A | 4/1929 | Chaplin |
| 1,793,089 A | 2/1931 | Heyes |

(Continued)

FOREIGN PATENT DOCUMENTS

| AT | 343455 B | * 5/1978 | ................ D21J 7/00 |
| CN | 1046952 A | 11/1990 | |

(Continued)

OTHER PUBLICATIONS

Swedish First Office Action and Search Report for Swedish Application No. 1950005-7, mailed Jun. 25, 2019, (6 pages).

(Continued)

*Primary Examiner* — Jose A Fortuna
(74) *Attorney, Agent, or Firm* — Kagan Binder, PLLC

(57) ABSTRACT

The document relates to a tool for producing a 3D molded product from a pulp slurry, comprising a pair of molds having respective product faces, that are configured to face each other and to press a pulp layer therebetween, said product faces providing a 3D shape for molding the 3D molded product, said product faces presenting a respective outer product face edge, defining an outermost limit of a forming area of mold. At least one of the product faces, as seen from the product face edge and inwardly towards a center of gravity of the product face, presents an outer zone (Z1) having effectively no porosity, and an inner zone (Z4) having a porosity of 40-75%, wherein a first intermediate zone (Z2) is arranged between the outer zone (Z1) and the inner zone (Z4), and has a porosity that is greater than that of the outer zone (Z1) and less than that of the inner zone (Z4).

21 Claims, 3 Drawing Sheets

(56) References Cited

U.S. PATENT DOCUMENTS

| | | | |
|---|---|---|---|
| 2,377,864 A | 6/1945 | Chaplin | |
| 2,927,635 A | 3/1960 | Crane | |
| 2,990,314 A | 6/1961 | Leitzel | |
| 3,067,470 A | 12/1962 | Stickney et al. | |
| 3,075,872 A | 1/1963 | Reifers | |
| 3,161,705 A * | 12/1964 | Kindseth | D21J 5/00 156/289 |
| 3,261,740 A | 7/1966 | Wells | |
| 3,284,284 A | 11/1966 | Wells | |
| 3,325,349 A | 6/1967 | Reifers | |
| 3,793,138 A | 2/1974 | Rohrer | |
| 4,014,737 A | 3/1977 | Brennan | |
| 4,337,116 A | 6/1982 | Foster et al. | |
| 5,039,465 A | 8/1991 | Freeman et al. | |
| 5,356,518 A | 10/1994 | Kelley et al. | |
| 5,399,243 A | 3/1995 | Miyamoto et al. | |
| 5,431,784 A | 7/1995 | Miyamoto et al. | |
| 5,547,544 A | 8/1996 | Miyamoto et al. | |
| 5,603,808 A | 2/1997 | Nishikawa | |
| 5,685,956 A | 11/1997 | Greve | |
| 5,745,971 A | 5/1998 | Ohsawa et al. | |
| 5,795,443 A | 8/1998 | Greve | |
| 6,210,531 B1 | 4/2001 | Bradford | |
| 6,461,480 B1 | 10/2002 | Otakura et al. | |
| 6,468,398 B1 | 10/2002 | Kumamoto et al. | |
| 6,576,089 B1 | 6/2003 | Sato et al. | |
| 6,605,187 B1 | 8/2003 | Nonomura et al. | |
| 6,645,348 B2 | 11/2003 | Kumamoto et al. | |
| 6,752,910 B2 | 6/2004 | Sato et al. | |
| 9,149,948 B2 | 10/2015 | Kuo et al. | |
| 9,650,746 B2 | 4/2017 | Choda et al. | |
| 9,739,016 B2 | 8/2017 | Kuo et al. | |
| 9,803,322 B2 | 10/2017 | Kuo et al. | |
| 9,856,608 B1 | 1/2018 | Chung et al. | |
| 10,435,848 B2 * | 10/2019 | Andersson | B22F 5/007 |
| 10,801,164 B2 * | 10/2020 | Andersson | B22F 5/007 |
| 11,391,001 B2 * | 7/2022 | Andersson | B22F 3/1109 |
| 2003/0111201 A1 | 6/2003 | Sato et al. | |
| 2005/0230863 A1 | 10/2005 | Scott et al. | |
| 2007/0164041 A1 | 7/2007 | Pierce et al. | |
| 2009/0139678 A1 * | 6/2009 | Nilsson | D21J 3/00 162/383 |
| 2009/0142523 A1 | 6/2009 | Nilsson et al. | |
| 2009/0283526 A1 | 11/2009 | Pierce et al. | |
| 2009/0291531 A1 | 11/2009 | Sato | |
| 2010/0279007 A1 | 11/2010 | Briselden et al. | |
| 2010/0291401 A1 | 11/2010 | Medina et al. | |
| 2011/0172798 A1 | 7/2011 | Staiger et al. | |
| 2016/0145811 A1 | 5/2016 | Socci et al. | |
| 2016/0168793 A1 | 6/2016 | Kuo et al. | |
| 2016/0168800 A1 | 6/2016 | Kuo et al. | |
| 2016/0168801 A1 | 6/2016 | Kuo et al. | |
| 2016/0244917 A1 | 8/2016 | Kuo et al. | |
| 2016/0368235 A1 | 12/2016 | Kuo et al. | |
| 2017/0226699 A1 | 8/2017 | Halvardsson et al. | |
| 2017/0284206 A1 | 10/2017 | Roberts et al. | |
| 2017/0370049 A1 | 12/2017 | Andersson et al. | |
| 2018/0187379 A1 | 7/2018 | Sundblad et al. | |
| 2019/0169800 A1 | 6/2019 | Hardacre et al. | |
| 2019/0194870 A1 | 6/2019 | Kuo et al. | |
| 2019/0284764 A1 | 9/2019 | Kuo et al. | |
| 2019/0301102 A1 | 10/2019 | Kuo et al. | |
| 2019/0376238 A1 | 12/2019 | Andersson et al. | |
| 2019/0376239 A1 | 12/2019 | Andersson et al. | |
| 2021/0269983 A1 * | 9/2021 | Pierce | D21J 7/00 |
| 2021/0316935 A1 * | 10/2021 | Pierce | B31F 1/007 |
| 2022/0049432 A1 * | 2/2022 | Pierce | D21J 3/10 |
| 2022/0403604 A1 | 12/2022 | Andersson et al. | |
| 2023/0107827 A1 * | 4/2023 | Briden | B33Y 50/02 425/84 |
| 2023/0340733 A1 * | 10/2023 | Turner | D21J 7/00 |
| 2023/0364831 A1 * | 11/2023 | Goldberg | B29C 33/3814 |
| 2023/0392322 A1 * | 12/2023 | Pierce | D21J 7/00 |

FOREIGN PATENT DOCUMENTS

| | | | |
|---|---|---|---|
| CN | 1099830 A | 3/1995 | |
| CN | 103751852 A | 4/2014 | |
| CN | 204849488 U | 12/2015 | |
| CN | 205443807 U | 8/2016 | |
| CN | 205688279 U | 11/2016 | |
| CZ | 309870 B6 * | 12/2003 | |
| DE | 102017219812 A1 | 5/2019 | |
| DE | 102018003447 A1 | 10/2019 | |
| EP | 0466653 A1 | 1/1992 | |
| EP | 0559490 A1 | 9/1993 | |
| EP | 0559491 A1 | 9/1993 | |
| EP | 0728868 A2 | 8/1996 | |
| EP | 3985170 A1 * | 4/2022 | D21J 3/00 |
| ES | 2927756 T3 * | 11/2022 | B22F 3/105 |
| FR | 1284406 A | 2/1962 | |
| GB | 468622 A | 7/1937 | |
| GB | 1411438 A * | 10/1975 | D21J 7/00 |
| GB | 2456502 A | 7/2009 | |
| JP | S51131942 U | 10/1976 | |
| JP | S63282301 A | 11/1988 | |
| JP | H06128900 A | 5/1994 | |
| JP | H06316900 A2 | 11/1994 | |
| JP | H0724855 A | 1/1995 | |
| JP | H0742100 A | 2/1995 | |
| JP | H08197553 A | 8/1996 | |
| JP | H08260400 A | 10/1996 | |
| JP | H09195200 A | 7/1997 | |
| JP | H09300446 A | 11/1997 | |
| JP | H09309153 A | 12/1997 | |
| JP | H09324399 A | 12/1997 | |
| JP | 2000054298 A | 2/2000 | |
| JP | 2001140200 A | 5/2001 | |
| JP | 2002201600 A | 7/2002 | |
| JP | 2003138500 A | 5/2003 | |
| JP | 2003306898 A | 10/2003 | |
| JP | 2007126757 A | 5/2007 | |
| JP | 2009293157 A | 12/2009 | |
| JP | 2013129921 A | 7/2013 | |
| JP | 2015086478 A | 5/2015 | |
| JP | 3221127 U | 5/2019 | |
| JP | 2022515888 A * | 2/2022 | |
| KR | 20190000074 U | 1/2019 | |
| TW | M511949 U | 11/2015 | |
| TW | M515462 U | 1/2016 | |
| TW | M515566 U | 1/2016 | |
| TW | M519157 U | 3/2016 | |
| TW | 201711926 A | 4/2017 | |
| TW | 621751 B | 4/2018 | |
| WO | 9722755 A1 | 6/1997 | |
| WO | 98035097 A1 | 8/1998 | |
| WO | 0058556 A1 | 10/2000 | |
| WO | 0116428 A1 | 3/2001 | |
| WO | 03035980 A1 | 5/2003 | |
| WO | 2006057610 A1 | 6/2006 | |
| WO | 2006057611 A1 | 6/2006 | |
| WO | WO-2006057609 A1 * | 6/2006 | D21J 3/00 |
| WO | 2007084067 A1 | 7/2007 | |
| WO | 2007106026 A1 | 9/2007 | |
| WO | 2007129972 A1 | 11/2007 | |
| WO | 2009132318 A1 | 10/2009 | |
| WO | 2010124300 A1 | 10/2010 | |
| WO | 2011059391 A1 | 5/2011 | |
| WO | 2011059392 A1 | 5/2011 | |
| WO | 2011059393 A1 | 5/2011 | |
| WO | 2011059394 A1 | 5/2011 | |
| WO | 2011065911 A1 | 6/2011 | |
| WO | WO11135512 A1 | 11/2011 | |
| WO | 2011159240 A1 | 12/2011 | |
| WO | 2012005683 A1 | 1/2012 | |
| WO | 2012033449 A1 | 3/2012 | |
| WO | 2014051447 A1 | 4/2014 | |
| WO | WO14105456 A1 | 7/2014 | |
| WO | WO14110679 A1 | 7/2014 | |
| WO | WO14150503 A1 | 9/2014 | |
| WO | 2016055073 A1 | 4/2016 | |
| WO | 2016101976 A1 | 6/2016 | |
| WO | 2018199993 A1 | 11/2018 | |

(56) References Cited

FOREIGN PATENT DOCUMENTS

| WO | 2018237279 | A1 | | 12/2018 | | |
|---|---|---|---|---|---|---|
| WO | 2019066659 | A2 | | 4/2019 | | |
| WO | 2020016407 | A1 | | 1/2020 | | |
| WO | 2020016409 | A1 | | 1/2020 | | |
| WO | 2020016411 | A1 | | 1/2020 | | |
| WO | 2020016413 | A2 | | 1/2020 | | |
| WO | 2020016416 | A2 | | 1/2020 | | |
| WO | WO-2020141208 | A1 | * | 7/2020 | ............. | B29C 33/02 |

OTHER PUBLICATIONS

International Preliminary Report on Patentability for International Application No. PCT/EP2020/050059, mailed Jul. 15, 2021, (7 pages).

Japanese Notice of Reasons for Refusal, and English Translation therefore, for Japanese Application No. 2021-538392, mailed Nov. 28, 2023, (10pages).

International Search Report and Written Opinion for International Application No. PCT/EP2020/050059, mailed Feb. 17, 2020, (12 pages).

Japanese Decision of Refusal, and English Translation therefore, for Japanese Counterpart Application No. 2021-538392, mailed Sep. 3, 2024, (12 pages).

* cited by examiner

TOOL AND METHOD FOR PRODUCING A 3D MOLDED PULP PRODUCT

CROSS-REFERENCE TO RELATED APPLICATIONS

This application claims priority to International Application No. PCT/EP2020/050059, filed Jan. 3, 2020 and titled "TOOL AND METHOD FOR PRODUCING A 3D MOLDED PULP PRODUCT," which in turn claims priority from a Swedish Patent Application having serial number 1950005-7, filed Jan. 3, 2019, titled "TOOL AND METHOD FOR PRODUCING A 3D MOLDED PULP PRODUCT," both of which are incorporated herein by reference in their entireties.

TECHNICAL FIELD

The present disclosure relates to a tool and a method for producing a molded pulp product. The method is particularly suitable for 3D molding of products from a pulp slurry. Such products may include trays, cups, plates and various containers for packaging.

BACKGROUND

From WO2016101976A1 there is known a method of producing products from a pulp slurry by applying the slurry layer to a porous mold and removing water from the slurry by simultaneously heating and pressing the slurry layer while drawing a vacuum through a mold wall, the other side of which being in contact with the slurry layer.

As is disclosed in WO2016101976A1, the molding process may be performed in two or more successive pressing steps, which is advantageous as it shortens cycle time and thus increases the throughput of the production process, as compared to a process with a single pressing step.

The production of pulp products using a porous mold is associated with various challenges resulting from the behavior of the pulp when interacting with the porous mold.

One particular problem which is addressed herein is the formation of a "beard" on inside corners of a mold. Such a "beard" is a result of a buildup of excessive amount of pulp. Such a beard has a negative impact on subsequent forming steps as well as on the appearance of the final product.

There is a need to reduce such "beard formation".

SUMMARY

An object of the present disclosure is to provide an improved tool and method of forming a 3D molded pulp product.

The invention is defined by the appended independent claims, with embodiments being set forth in the appended dependent claims, in the following description and in the attached drawings.

According to a first aspect, there is provided a tool for producing a 3D molded product from a pulp slurry, comprising a pair of molds having respective product faces, that are configured to face each other and to press a pulp layer therebetween, said product faces providing a 3D shape for molding the 3D molded product, said product faces presenting a respective outer product face edge, defining an outermost limit of a forming area of at least one of the molds, preferably both, wherein at least one of the product faces, as seen from the product face edge and inwardly towards a center of gravity of the product face, presents an outer zone having effectively no porosity, and an inner zone having a porosity of 40-75%, wherein a first intermediate zone is arranged between the outer zone and the inner zone, and has a porosity that is greater than that of the outer zone and less than that of the inner zone.

The term "porosity" is defined as the ratio of pore surface to total surface of a given area of a zone.

By gradually reducing the porosity at the brim area, the vacuum formed at the outermost portion of the mold is gradually reduced and thus buildup of an excessive amount of pulp at the outermost portion of the mold can be prevented or eliminated.

The outer zone can present a porosity of less than 1%, preferably less than 0.5% or less than 0.1%.

The first intermediate zone can present a porosity that is 25-75% of that of the inner zone.

The product face can present a second intermediate zone having a porosity that is greater than that of the first intermediate zone but less than that of the inner zone.

The second intermediate zone can present a porosity that is 40-85% of that of the inner zone.

The porous product face can present pores having a greatest cross sectional width of 0.1-0.7 mm, preferably 0.25-0.6 mm.

The first intermediate zone can present pores having a smaller average greatest cross section than the pores presented by the inner zone.

The second intermediate zone can present pores having a greater average greatest cross section than the pores presented by the first intermediate zone.

The mold can comprise a brim portion which runs around a periphery of the mold and which presents an angle of more than 60 degrees, preferably more than 75 degrees or 85-90 degrees to a relative movement direction of the molds.

The outer zone can be formed in the brim portion.

The outer zone can be outwardly limited by a wall which extends at an angle of less than 50 degrees, preferably less than 30 degrees or 0-10 degrees to the relative movement direction of the molds.

The outer zone can extend inwardly from an imaginary point of intersection between the wall and the brim portion by a distance of less than 0.5 mm, preferably less than 0.3 mm.

Thus, a soft transition may be present between the wall and the brim portion of the mold.

The "imaginary point of intersection" is defined as a point where an imaginary line along the wall intersects an imaginary line along the brim portion, as seen in a cross-sectional plane perpendicular to the wall and the brim portion.

According to a second aspect of the present disclosure, a method of producing a 3D molded product from a pulp slurry is provided, the method comprising applying a pulp slurry layer to a porous product face of a first mold; in a first forming step, pressing the pulp slurry layer against the porous product face of the first mold, while heating the pulp slurry layer and drawing a vacuum through the porous forming face of the first mold, wherein the vacuum drawn through the porous forming face of the first mold is gradually reduced towards an outer product face edge, which defines an outermost limit of a forming area of the tool, said reduction being achieved through gradual reduction of a porosity of the porous forming face.

The first mold may form part of a mold set according to what has been described above.

The method may further comprise transferring the pulp slurry layer to a porous forming face of a second mold, and in a second, subsequent, forming step, pressing the pulp slurry layer against the porous forming face of the second mold, while heating the pulp slurry layer and drawing a vacuum through the porous forming face of the second mold.

In the first forming step, the forming face of the first mold can be heated to about 150-400° C., preferably 200-300° C.

In the first forming step, the pulp slurry layer can be pressed against the forming face of the first mold with a pressure of about 390-1570 kPa, preferably 580-1170 kPa.

In the first forming step, the pulp slurry layer can be pressed against the forming face of the first mold during a first pressing time of 0.1-4.0 second, preferably 0.5-2.0 second.

In the first forming step, an initial water content of the pulp slurry layer can be 70-90% by weight and a final water content can be 45-65% by weight, preferably about 50-60% by weight.

A vacuum level at the rear side of the forming face of the second mold can be 50-99 kPa, preferably 65-85 kPa.

The method can further comprise transferring the pulp slurry layer to a porous forming face of a third mold, and in a third, subsequent, forming step, pressing the pulp slurry layer against the porous forming face of the third mold, while heating the pulp slurry layer and drawing a vacuum through the porous forming face of the third mold, wherein a vacuum level in the second forming step is greater than in the third forming step.

A third vacuum level at the rear side of the forming face of the third mold can be 50-99 kPa, preferably 65-85 kPa.

In the third forming step, the forming face of the third mold can be heated to about 100-300° C., preferably 200-280° C.

In the third forming step, the pulp slurry layer can be pressed against the forming face of the third mold with a pressure of about 390-1570 kPa, preferably 580-1170 kPa.

In the third forming step, the pulp slurry layer can be pressed against the forming face of the third mold during a third pressing time of 0.1-4.0 second, preferably 0.5-2.0 second.

In the third forming step, an initial water content of the pulp slurry layer can be about 25-45% or 25-40% by weight, preferably about 30-40% or 30-35% by weight, and a final water content can be less than about 5% by weight, preferably less than about 1% by weight.

The first mold can be a pick-up mold, on which pulp slurry is applied from liquid form, said pulp slurry having a pulp concentration of less than 0.5% by weight, preferably less than 0.49% or 0.005-0.025%.

DETAILED DESCRIPTION

Figure 1A:
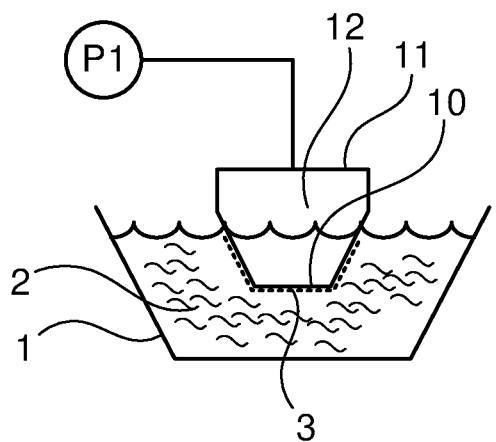
FIGS. 1a-1c schematically illustrate a molding device.

FIG. 1a schematically illustrates a pickup tool 10 which is partially immersed in container 1 holding a pulp slurry 2. The pickup tool is mounted to a tool holder 11, which together with the pickup tool defines a vacuum chamber 12 that is connected to a pressure regulator P1. The pressure regulator may have the capability of selectively generating an at least partial vacuum (i.e. air pressure lower than ambient air pressure) and/or an air pressure greater than ambient air pressure.

While the pickup tool is immersed in the pulp slurry 2, the pressure regulator P1 may generate a vacuum, causing pulp fibers 3 to stick to a product face of the pickup tool 10.

Figure 1B:
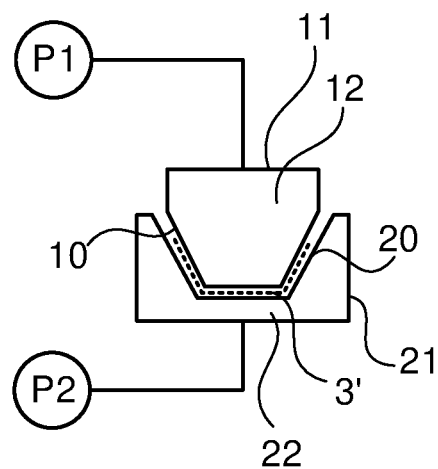

FIG. 1b schematically illustrates the pickup tool 10 transferring the pulp fibers 3 to a transfer tool 20. The transfer tool may be connected to a second pressure regulator P2, which is capable of generating a vacuum or an air pressure. The transfer tool may also be mounted on a transfer tool holder 21 so as to define a vacuum chamber 22, which is connected to the second pressure regulator.

During the transfer of the pulp fibers 3 from the pickup tool to the transfer tool, an air pressure greater than ambient pressure may be generated by the first pressure regulator P1 to cause the pulp fibers to release from the pickup tool.

Alternatively, or as a supplement, a vacuum may be generated by the second pressure regulator P2, causing the pulp fibers to be received by the transfer tool 20.

Figure 1C:
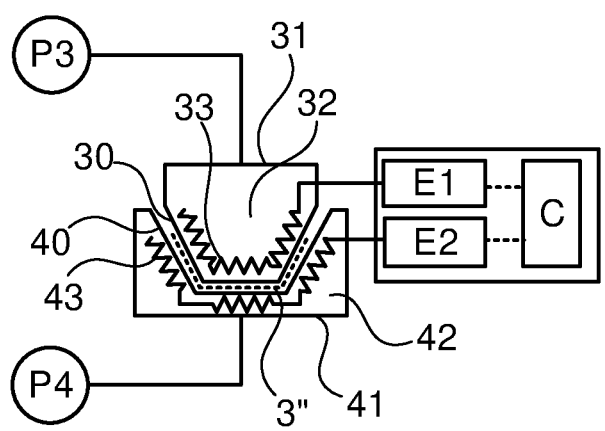

FIG. 1c schematically illustrates a pressing arrangement comprising a male pressing tool 30 and a female pressing tool 40. One, or both, of the pressing tools may be mounted on a respective tool holder 31, 41 and be connected to a respective vacuum chamber 32, 42. The vacuum chambers may be connected to a respective pressure regulator P3, P4.

One, or both, of the pressing tools may be provided with a heating element 33, 43, energized by an energy supply E1, E2 and optionally controlled by a controller C. The heating may be achieved by electric heating elements, hot air or liquid or induction.

The pressing tools and their associated tool holders may be movable relative one another between an open position, wherein a partially molded pulp product may be inserted, and a pressing position, wherein the pressing tools are forced towards each other thus pressing the product 3" between product faces of the respective tool 30, 40.

When in the pressing position, heat may be supplied by one, or both, of the heaters 33, 43.

During the pressing step, one or both pressure regulators P3, P4 may provide a vacuum to assist in the evacuation of water vapor from the product 3".

As an alternative, one of the pressure regulators may provide a vacuum while the other one provides a pressure greater than the ambient air pressure.

Optionally, hot air or steam may be introduced through the molds during the pressing process (FIG. 1c).

It is noted that two or more successive pressing steps may be used, e.g. to gradually form all or parts of the product 3" and/or to apply additional features to the product, such as coatings, decors and the like.

In one embodiment, steps are performed in accordance with what has been described with respect to FIGS. 1a, 1b and 1c.

Figure 2:
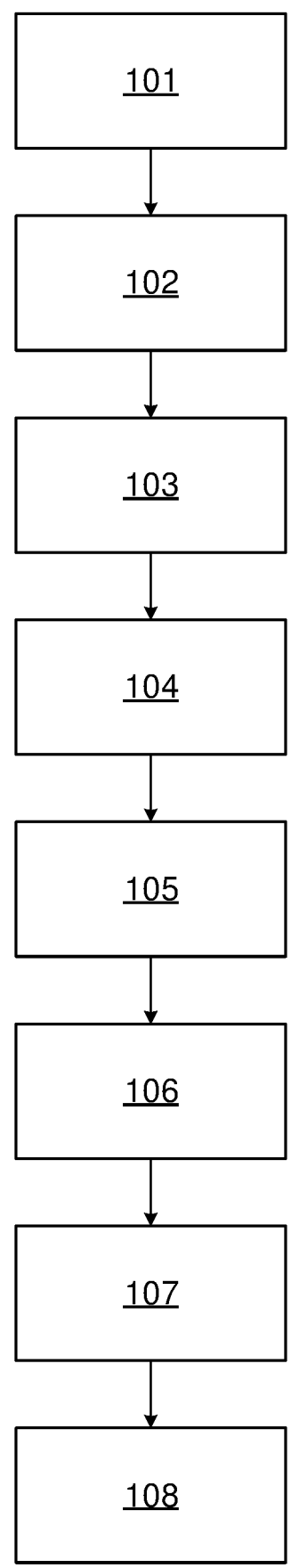
FIG. 2 schematically illustrates a production process.

Referring to FIG. 2, a production process will now be described.

In a first step 101, a pulp slurry layer is provided, e.g. as described with reference to FIG. 1a, wherein a porous pickup tool may be submerged in a pulp slurry with vacuum being applied to a rear side of the pickup tool.

Alternatively, the pulp slurry may be applied to the pickup tool by a coating operation, such as spray coating.

In a second step 102, the pulp slurry layer is transferred from the pickup tool to a first press tool. The transfer may be performed by the pickup tool, or by means of a separate transfer tool, which may have a transfer tool wall portion that is porous. During the transfer step, a vacuum may be applied to the rear side of the transferring tool wall, such that the pulp slurry layer is held to the transferring tool wall. In order to release the pulp slurry layer from the transferring tool wall, it is possible to instead apply pressurized air to the rear side of the transferring tool wall.

Alternatively, the pulp slurry layer may be applied directly to the first press tool. That is, the pulp slurry layer may be formed directly on the first press tool by application of the pulp slurry to the porous forming face of the first press tool. The pulp slurry layer may be applied directly to the first press tool by submerging a tool part of the first press tool, presenting a porous wall portion, in a pulp slurry with vacuum being applied to a rear side of the porous wall portion. Alternatively, the pulp slurry may be applied to the porous forming face of the first press tool by a coating operation, such as spray coating.

In a third step 103, the pulp slurry layer may be pressed in the first press tool, which may comprise a pair of mating tool parts, one of which may have a porous wall portion, which contacts the pulp slurry layer, and through which a vacuum can be drawn.

In this first pressing step 103, a pressure lower than the surrounding ambient pressure is applied at a rear side of the porous wall portion, thus resulting in a vacuum at the rear side of the porous wall portion, causing solvent vapor, such as steam, to be drawn through the tool.

The pressure applied to the rear side of the porous wall portion may be on the order of low or medium level vacuum. That is, the pressure may be more than 1 Pa, but less than ambient pressure. Preferably, the pressure may be on the order of 1 kPa to ambient pressure.

In the first pressing step, a first vacuum level at the rear side of the forming face of the first mold may be about 50-99 kPa, and typically 65-85 kPa.

In the first pressing step, a first pressure at a rear side of the forming face of the first mold may be 200-900 mbarA (millibar absolute), preferably 300-800 mbarA.

The forming face of the first mold may be heated to about 150-500° C., preferably 150-400° C., 200-500° C., 200-400° C., or 200-300° C., and in most cases 240-280° C. Typically, all mold faces contacting the pulp slurry are heated.

A pressing pressure between mold faces may be on the order of about 390-1570 kPa, and in most cases 580-1170 kPa.

The pressing pressure may be applied during a first pressing time of 0.1-4.0 second, preferably 0.5-2.0 second. In most settings, a pressing time on the order of 0.5-1.5 second is sufficient, and often also 0.5-1 second.

Typically, in this first step, an initial water content of the pulp slurry layer is 70-90% by weight and after the pressing step has been performed, a final water content may be 45-65% by weight, typically about 50-60% by weight.

After the first pressing step 103, the pulp slurry layer, now with a substantial amount of its solvent removed, may be transferred 104 to a second press tool. The transfer 104 may be performed in the same manner as the first transfer step 102, and with similar equipment. The second press tool may be designed essentially as the first press tool.

In a second pressing step 105, the pulp slurry layer may be pressed in the second press tool, which may comprise a pair of mating tool parts, one of which may have a porous wall portion, which contacts the pulp slurry layer, and through which a vacuum can be drawn.

In this second pressing step 105, a pressure lower than the surrounding ambient pressure is applied at a rear side of the porous wall portion, thus resulting in a vacuum at the rear side of the porous wall portion, causing solvent vapor, such as steam, to be drawn through the tool.

In the second pressing step, a second vacuum level at the rear side of the forming face of the second mold may be about 50-99 kPa, and typically 65-85 kPa, but always lower vacuum level than in the first pressing step.

In the second pressing step, a second pressure at a rear side of the forming face of the second mold may be 200-900 mbarA (millibar absolute), preferably 300-800 mbarA.

The forming face of the second mold may be heated to about 110-500° C., preferably 110-400° C., 150-500° C., 150-400° C., 200-500° C., 200-400° C., or 200-300° C., and in most cases 240-280° C. Typically, all mold faces making up the second mold and contacting the pulp slurry layer may be heated.

A pressing pressure between mold faces may be on the order of about 390-1570 kPa, and in most cases 580-1170 kPa.

The pressing pressure may be applied during a second pressing time of 0.1-4.0 second, preferably 0.5-2.0 second. In most settings, a pressing time on the order of 0.5-1.5 second is sufficient, and often also 0.5-1 second.

Typically, in this second pressing step, an initial water content of the pulp slurry layer may be about 45-65%, typically about 50-60% by weight.

A final water content may be about 25-40% by weight, preferably about 30-35% by weight.

After the second pressing step 105, the pulp slurry layer, now with a substantial amount of its solvent removed, may be transferred 106 to a third press tool. The transfer 106 may be performed in the same manner as the first transfer step 102 and/or the second transfer step 104, and with similar equipment. The third press tool may be designed essentially as the first press tool.

In a third pressing step 107, the pulp slurry layer may be pressed in the third press tool, which may comprise a pair of mating tool parts, one of which may have a porous wall portion, which contacts the pulp slurry layer, and through which a vacuum can be drawn.

In this third pressing step 107, a pressure lower than the surrounding ambient pressure is applied at a rear side of the porous wall portion, thus resulting in a vacuum at the rear side of the porous wall portion, causing solvent vapor, such as steam, to be drawn through the tool.

In the third pressing step, a third vacuum level at the rear side of the forming face of the third mold may be about 50-99 kPa, and typically 65-85 kPa, but always lower vacuum level than in the second pressing step.

In the third pressing step, a third pressure at a rear side of the forming face of the third mold may be 200-900 mbarA (millibar absolute), preferably 300-800 mbarA.

The forming face of the third mold may be heated to about 100-400° C., preferably 100-300° C., 150-400° C., 150-300° C., 200-300° C., or 200-280° C., and in most cases 240-280° C. Typically, all mold faces making up the third mold and contacting the pulp slurry layer may be heated.

A pressing pressure between mold faces may be on the order of about 390-1570 kPa, and in most cases 580-1170 kPa.

The pressing pressure may be applied during a third pressing time of 0.1-4.0 second, preferably 0.5-2.0 second. In most settings, a pressing time on the order of 0.5-1.5 second is sufficient, and often also 0.5-1 second.

Typically, in this third pressing step, an initial water content of the pulp slurry layer may be about 25-45% or 25-40% by weight, preferably about 30-40% or 30-35% by weight, and a final water content may be less than about 5% by weight, preferably less than about 1% by weight.

After the third pressing step 107, the pulp slurry layer, now with most of its solvent removed, may be transferred 108 out of the machine.

Optionally, additional steps, such as surface treatment, cutting or printing may be performed on the thus essentially dry product. The product may then be packaged, stored and shipped.

It is noted that the third pressing step 107, and thus also its related transfer step 106, is optional. Hence, the process may be finished after the second pressing step 105 with the output step 108 following immediately.

Thus, in the first pressing step, an initial water content of the pulp slurry layer may be 70-90% by weight and a final water content may be 25-50% by weight, preferably about 30-35% by weight.

In the second pressing step, an initial water content of the pulp slurry layer may be about 25-50%, preferably about 30-35% by weight, and a final water content may be less than about 5% by weight, preferably less than about 1% by weight.

Figure 3:
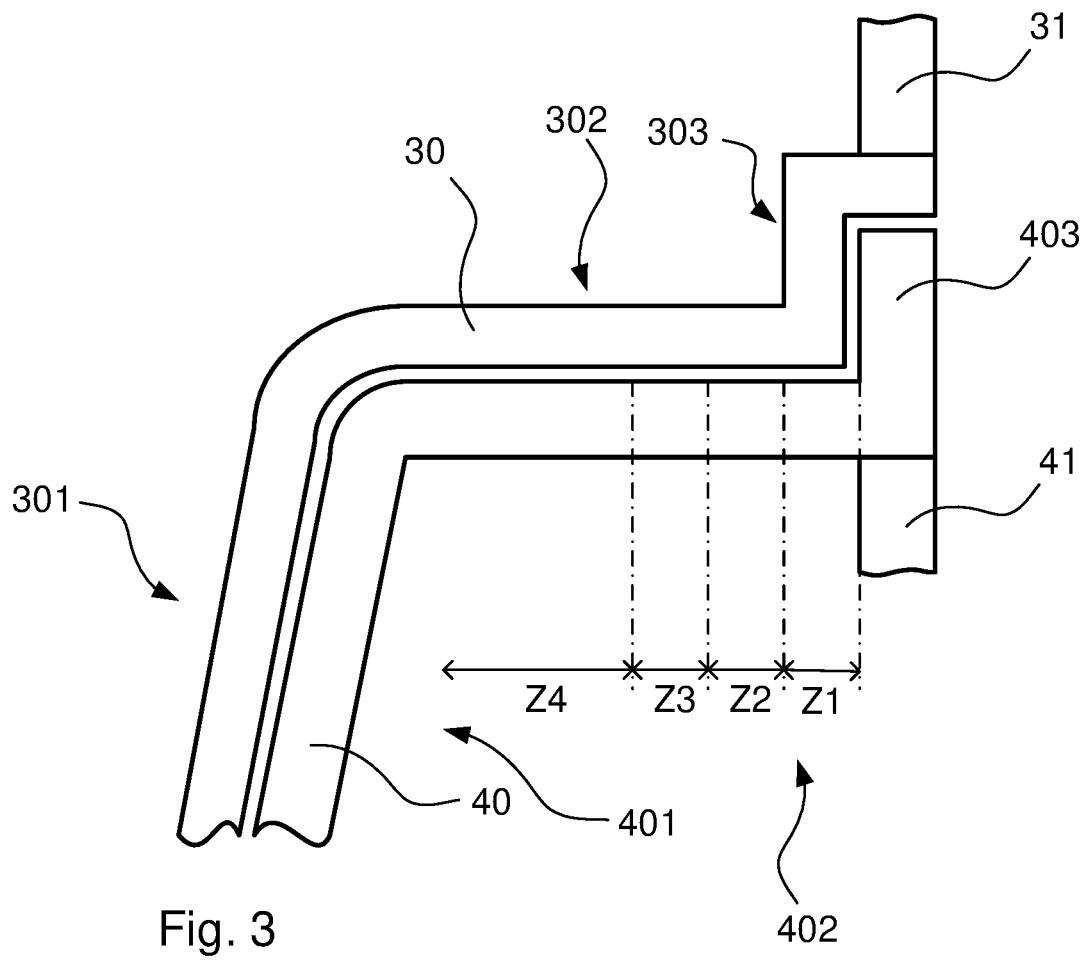
FIG. 3 schematically illustrates a brim portion of a pair of molds 30, 40.
Figure 4:
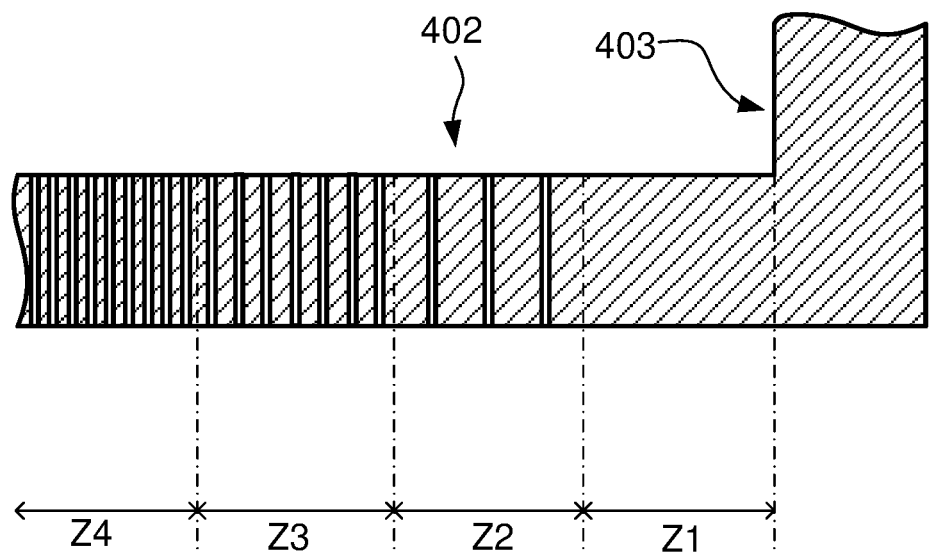
FIG. 4 is an enlarged schematic view of the brim portion of the female mold 40.

Referring to FIGS. 3 and 4, a brim portion of a tool set is illustrated. FIG. 3 illustrates the male mold 30 and the female mold 40, with a respective out-of-plane portion 301, 401 and a respective brim portion 302, 402 surrounding the out-of-plane portions 301, 401. The brim portion may, but need not, also include a respective outer brim wall 303, 403, formed at the outermost part of the brim 302, 402.

The brim 302, 402 may be substantially planar and may surround the out-of-plane portion 301, 401.

While the brim portion may be substantially planar and extend substantially perpendicular to a relative movement direction of the molds during the final part of the pressing operation, the brim wall 303, 403 may extend substantially perpendicularly to the brim portion 302, 402.

In reality, the brim portion 302, 402 may extend 60-90 degrees relative to the movement direction, preferably 75-90 degrees, 85-90 degrees or 89-90 degrees.

Likewise, the wall portion 303, 403 may extend 0-60 degrees relative to the movement direction, preferably 0-45 degrees, 0-30 degrees, 0-15 degrees, 0-5 degrees or 0-1 degrees.

The brim portion may extend from an imaginary point of intersection between the surface of the wall portion 303, 403 and the surface of the brim portion 302, 402. Thus, for each mold, a soft transition may be present between the wall 303, 403 and the brim portion 302, 402 respectively, wherein the "imaginary point of intersection" is the point where an imaginary line along the wall intersects an imaginary line along the brim portion, as seen in a cross-sectional plane perpendicular to the wall and the brim portion.

The extent of the brim portion may be a total of 1-15 mm, wherein each zone extends over less than 1 mm, preferably less than 0.5 mm or less than 0.3 mm.

As mentioned above, one or both of the molds 30, 40 may have a porous forming face. In the illustrated example, the female mold 40 is illustrated as having the porous forming face, but it may also, or instead, be the male mold 30 that has the porous forming face.

At a central portion of the mold 30, 40, there may be a predetermined nominal porosity, which may be constant or which may vary over the central portion.

The central portion may be anything inside the brim portion and any transition from the brim portion to the wall.

At the brim portion 402, there may be a gradually reducing porosity, with zero porosity at the outermost part of the brim portion 402.

In the illustrated example, the brim portion 402 is divided into three zones: a first zone Z1 with zero or very low porosity; a second zone Z2 with greater porosity, a third zone Z3, which is optional, and having even greater porosity than the second zone Z2 and then the inner zone Z4 having the nominal porosity.

The invention claimed is:

1. A tool for producing a 3D molded product from a pulp slurry, comprising:
   a pair of molds having respective product faces, that are configured to face each other and to press a pulp slurry layer therebetween,
   said product faces providing a 3D shape for molding the 3D molded product,
   said product faces presenting a respective outer product face edge, defining an outermost limit of a forming area of at least one of the molds,
   wherein at least one of the product faces, as seen from the product face edge and inwardly towards a center of gravity of the product face, presents:
   an outer zone having effectively no porosity such that the outer zone presents a porosity of less than 1%,
   an inner zone having a porosity of 40-75%, and
   a first intermediate zone, arranged between the outer zone and the inner zone, and having a porosity that is greater than that of the outer zone and less than that of the inner zone.

2. The tool as claimed in claim 1, wherein the outer zone presents a porosity of less than 0.5%.

3. The tool as claimed in claim 1, wherein the first intermediate zone presents a porosity that is 25-75% of that of the inner zone.

4. The tool as claimed in claim 1, wherein the product face presents a second intermediate zone having a porosity that is greater than that of the first intermediate zone but less than that of the inner zone.

5. The tool as claimed in claim 4, wherein the second intermediate zone presents a porosity that is 40-85% of that of the inner zone.

6. The tool as claimed in claim 1, wherein the porous product face presents pores having a greatest cross sectional width of 0.1-0.7 mm.

7. The tool as claimed in claim 6, wherein the first intermediate zone presents pores having a smaller average greatest cross section than the pores presented by the inner zone.

8. The tool as claimed in claim 7, wherein the second intermediate zone presents pores having a greater average greatest cross section than the pores presented by the first intermediate zone.

9. The tool as claimed in claim 1, wherein the mold comprises a brim portion which runs around a periphery of the mold and which presents an angle of more than 60 degrees to a relative movement direction of the molds.

10. The tool as claimed in claim 9, wherein the outer zone is formed in the brim portion.

11. The tool as claimed in claim 9, wherein the outer zone is outwardly limited by a wall which extends at an angle of less than 50 degrees to the relative movement direction of the molds.

12. The tool as claimed in claim 11, wherein the outer zone extends inwardly from an imaginary point of intersection between the wall and the brim portion by a distance of less than 0.5 mm.

13. A method of producing a 3D molded product from a pulp slurry, comprising:
providing a tool according to claim 1,
applying a pulp slurry layer to a porous product face of a first mold of said tool,
in at least one forming step, pressing the pulp slurry layer to form said 3D molded product.

14. The method according to claim 13, comprising: in a first forming step, pressing the pulp slurry layer against the porous product face of the first mold.

15. The method according to claim 14, wherein the pressing is performed while drawing a vacuum through the porous product face of the first mold,
wherein the vacuum drawn through the porous product face of the first mold is gradually reduced towards the outer product face edge, which defines an outermost limit of a forming area of the first mold,
said reduction being achieved through gradual reduction of a porosity of the porous product face of the first mold.

16. The method according to claim 14, wherein the pressing is performed while heating the pulp slurry layer.

17. The method according to claim 14, wherein, in the first forming step, an initial water content of the pulp slurry layer is 70-90% by weight.

18. A tool for producing a 3D molded product from a pulp slurry comprising at least a first mold,
the first mold having a porous product face providing a 3D shape for molding the 3D molded product,
said porous product face presenting an outer product face edge, defining an outermost limit of a forming area of the first mold,
wherein the first mold presents a gradual reduction of a porosity of the porous product face from an inner part of the product face to the outer product face edge.

19. The tool according to claim 18, wherein the product face, as seen from the product face edge and inwardly towards a center of gravity of the product face, presents:
an outer zone having effectively no porosity such that the outer zone presents a porosity of less than 1%,
an inner zone having a porosity of 40-75%, and
a first intermediate zone, arranged between the outer zone and the inner zone, and having a porosity that is greater than that of the outer zone and less than that of the inner zone.

20. The tool according to claim 18, further comprising a second mating mold, wherein the first mold and the second mating mold forms a pair of molds having respective product faces, that are configured to face each other and to press a pulp slurry layer therebetween.

21. A method of producing a 3D molded product from a pulp slurry, comprising:
providing a tool according to claim 20,
applying a pulp slurry layer to a porous product face of a first mold of said tool,
in at least one forming step, pressing the pulp slurry layer to form said 3D molded product.

\* \* \* \* \*